United States Patent
Caine et al.

(10) Patent No.: US 10,348,561 B1
(45) Date of Patent: Jul. 9, 2019

(54) SYSTEMS AND METHODS FOR AUTOMATED ACCESS TO RELEVANT INFORMATION IN A MOBILE COMPUTING ENVIRONMENT

(71) Applicant: Rockwell Automation, Inc., Milwaukee, WI (US)

(72) Inventors: Tim Caine, Cumming, GA (US); Randy Cannady, Canton, GA (US)

(73) Assignee: Rockwell Automation, Inc., Milwaukee, WI (US)

( * ) Notice: Subject to any disclaimer, the term of this patent is extended or adjusted under 35 U.S.C. 154(b) by 986 days.

(21) Appl. No.: 14/549,297

(22) Filed: Nov. 20, 2014

Related U.S. Application Data

(60) Provisional application No. 61/906,629, filed on Nov. 20, 2013.

(51) Int. Cl.
   *H04L 12/24* (2006.01)
   *H04L 29/08* (2006.01)

(52) U.S. Cl.
   CPC .......... *H04L 41/082* (2013.01); *H04L 67/306* (2013.01)

(58) Field of Classification Search
   None
   See application file for complete search history.

(56) References Cited

U.S. PATENT DOCUMENTS

| | | | |
|---|---|---|---|
| 4,281,379 A * | 7/1981 | Austin | G05B 19/4093 318/569 |
| 5,812,394 A * | 9/1998 | Lewis | G05B 19/0426 700/17 |
| 6,088,679 A | 7/2000 | Barkley | |
| 6,237,036 B1 | 5/2001 | Ueno et al. | |
| 6,501,421 B1 | 12/2002 | Dutta et al. | |
| 6,798,358 B2 | 9/2004 | Joyce et al. | |
| 7,194,446 B1 | 3/2007 | Bromley et al. | |
| 7,308,251 B2 | 12/2007 | Karaoguz | |

(Continued)

OTHER PUBLICATIONS

Behzadan, Amir H. et al., "Ubiquitous location tracking for context-specific information delivery on construction sites", Automation in Construction, 2008, pp. 737-748, vol. 17, Elsevier B.V.

(Continued)

*Primary Examiner* — Lynn D Feild
*Assistant Examiner* — Richard A McCoy
(74) *Attorney, Agent, or Firm* — Fletcher Yoder, P.C.

(57) ABSTRACT

A system for configuring and providing automated access to content based on the access rights of a mobile computing device, the location of a mobile computing device, and the user operating the mobile computing device. The system uses a centralized database and management system to configure and manage access to content. The system determines the information that is relevant when a device and user are physically present at a specific location. The system then facilitates access to content on the mobile computing device for user interaction. Access to information is controlled by the system based on a combination of permissions shared by the mobile computing device, the user, and the current location. In one embodiment, access to content is governed by the spatial proximity of the device to some physical asset. In one embodiment, multiple location checks are performed before content is delivered.

21 Claims, 7 Drawing Sheets

EXEMPLARY CONTENT
DELIVERY PROCESS

(56) References Cited

U.S. PATENT DOCUMENTS

| | | |
|---|---|---|
| 7,428,411 B2 | 9/2008 | Zellner |
| 7,433,741 B2 | 10/2008 | Bromley et al. |
| 7,500,597 B2 | 3/2009 | Mann et al. |
| 7,716,240 B2 | 5/2010 | Lim |
| 7,962,229 B2 | 6/2011 | Bromley et al. |
| 8,099,105 B2 | 1/2012 | Morin |
| 8,151,196 B2 | 4/2012 | Britt et al. |
| 8,260,736 B1* | 9/2012 | Lear .................. G06N 5/02 706/46 |
| 8,401,568 B2 | 3/2013 | Sylvain |
| 8,417,741 B2 | 4/2013 | Watterott et al. |
| 8,478,772 B2* | 7/2013 | Wong ............ G06F 17/30427 707/760 |
| 8,677,262 B2 | 3/2014 | Baier et al. |
| 8,682,049 B2 | 3/2014 | Zhao et al. |
| 8,760,349 B2* | 6/2014 | Konanur ............ H01Q 1/2266 343/700 MS |
| 8,775,509 B2* | 7/2014 | Dirstine ............... H04L 67/02 709/201 |
| 8,949,970 B2 | 2/2015 | Bush et al. |
| 9,292,309 B2 | 3/2016 | Britt et al. |
| 9,300,673 B2 | 3/2016 | Bush et al. |
| 9,330,257 B2* | 5/2016 | Valencia ............ G06F 21/552 |
| 9,355,231 B2* | 5/2016 | Disraeli ............... G06F 21/31 |
| 9,356,918 B2* | 5/2016 | Tsui ................... G06F 21/10 |
| 9,425,973 B2* | 8/2016 | Quinn ................. H04L 67/02 |
| 9,432,243 B2* | 8/2016 | Burckart ............. G06F 17/30 |
| 9,496,968 B2* | 11/2016 | Bakar .................. H04B 14/00 |
| 9,654,897 B1* | 5/2017 | Macaluso ............ H04W 4/00 |
| 9,697,297 B2* | 7/2017 | James ............ G06F 17/30887 |
| 9,813,307 B2* | 11/2017 | Walsh ................ H04L 67/025 |
| 2002/0136226 A1* | 9/2002 | Christoffel ............ H04W 12/02 370/401 |
| 2003/0156591 A1* | 8/2003 | Sorsa ................... H04L 67/42 370/401 |
| 2009/0150981 A1* | 6/2009 | Amies ................. H04L 63/102 726/5 |
| 2009/0307753 A1 | 12/2009 | Dupont et al. |
| 2013/0091543 A1* | 4/2013 | Wade .................... G06F 21/54 726/1 |
| 2013/0160076 A1* | 6/2013 | Morita ................. G06F 21/604 726/1 |
| 2013/0225282 A1* | 8/2013 | Williams .............. A63F 13/216 463/29 |
| 2013/0309971 A1 | 11/2013 | Kiukkonen et al. |
| 2014/0006347 A1 | 1/2014 | Qureshi et al. |
| 2014/0036754 A1* | 2/2014 | Narasimhan ............ H04W 4/08 370/312 |
| 2014/0068030 A1 | 3/2014 | Chambers et al. |
| 2014/0095180 A1 | 4/2014 | Venkat et al. |

OTHER PUBLICATIONS

Hiltbrand, Troy, "Context-Enabled Business Intelligence", Business Intelligence Journal, 2012, vol. 17 No. 2, Data Warehousing Institute, Seattle, US.

Kumar, Mahendra et al., "STRBAC—An Approach Towards Spatio-Temporal Role-Based Access Control", *Proceedings of the Conference on Communication, Network, and Information Security (CNIS)*, 2006, pp. 150-155, CTA Press, Calgary, A.B., Canada.

* cited by examiner

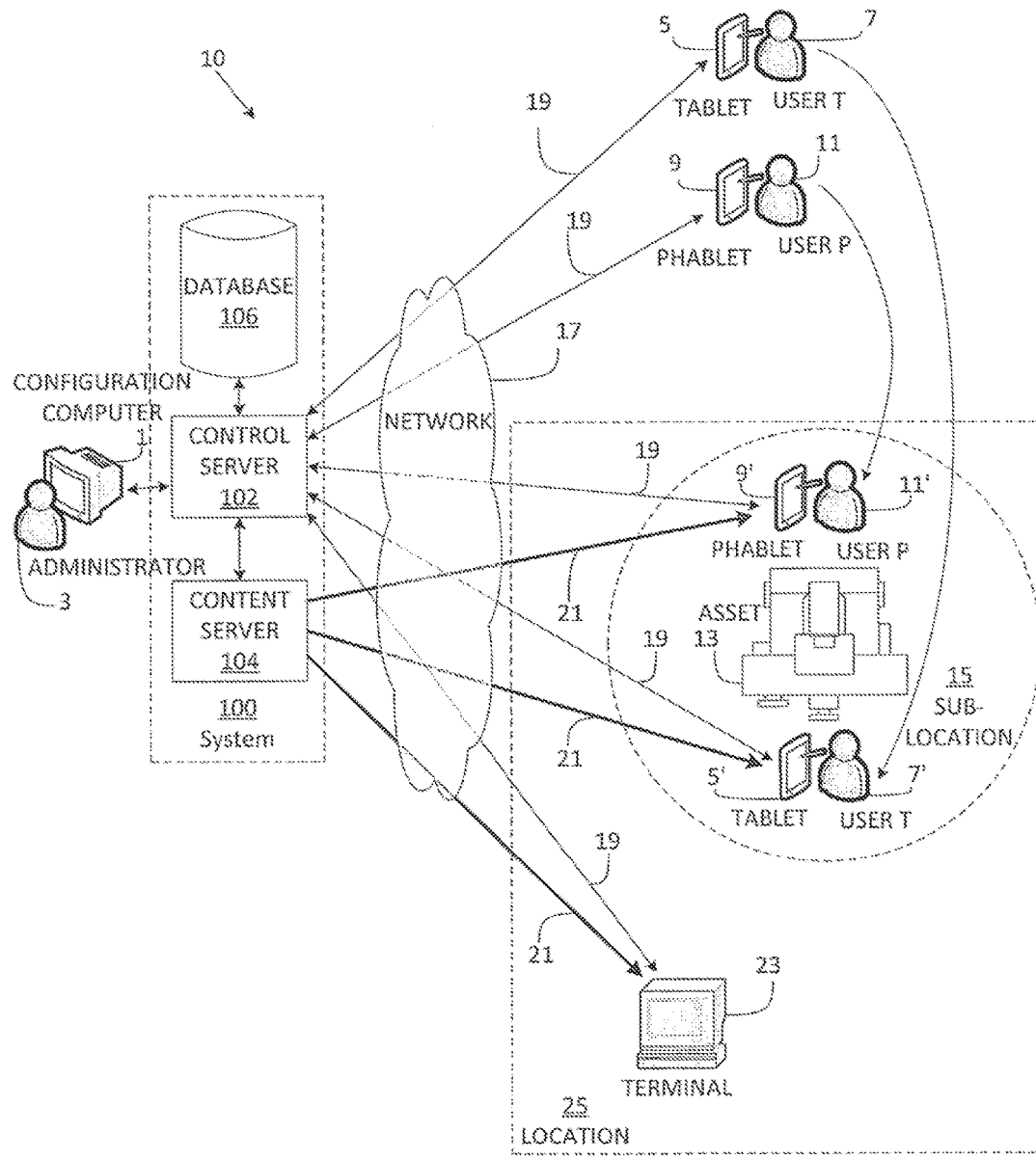
FIG. 1  EXEMPLARY ENVIRONMENT OF LOCATION-BASED CONTENT DELIVERY SYSTEM

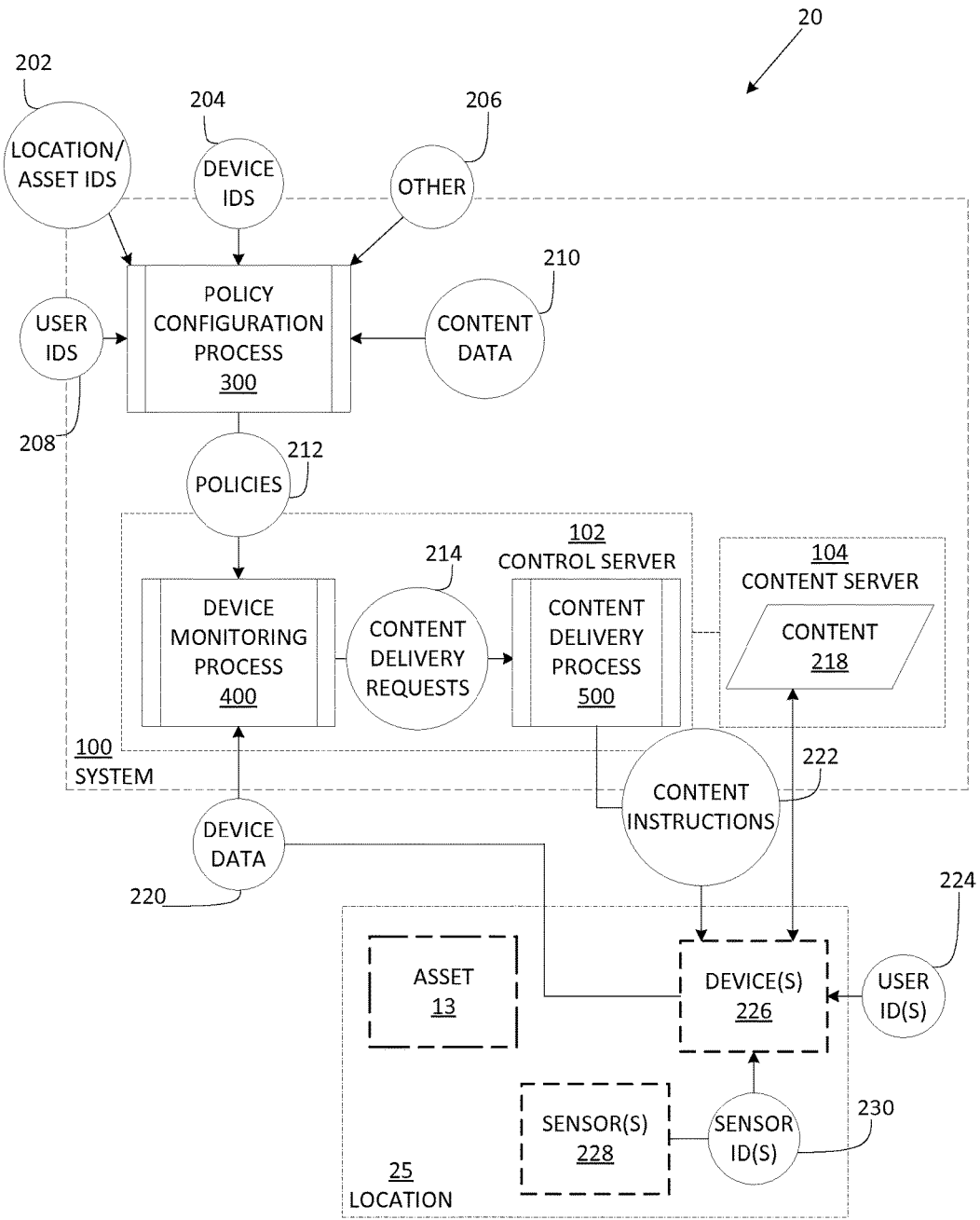
FIG. 2A EXEMPLARY ONE-LOCATION SYSTEM ARCHITECTURE

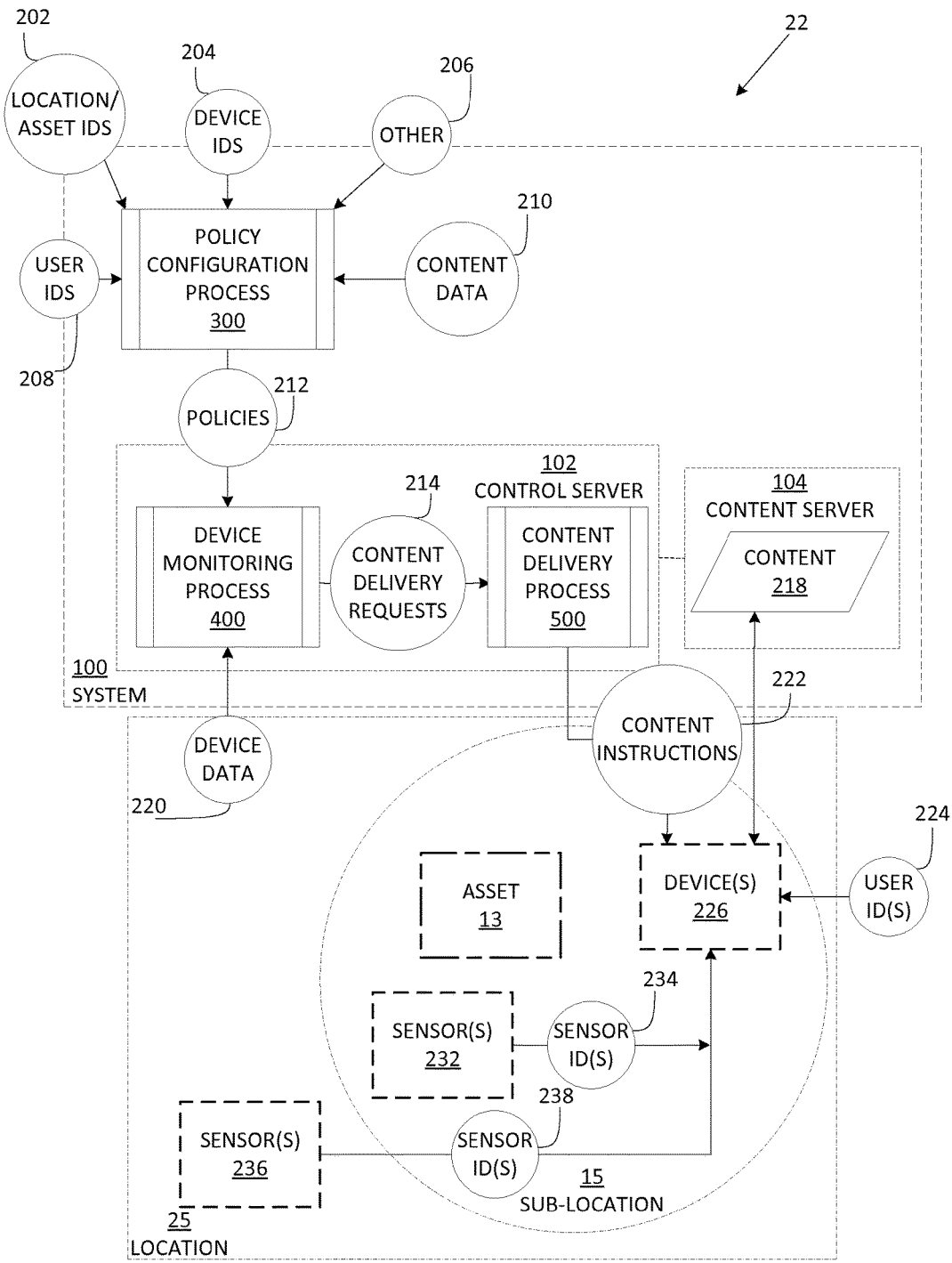
FIG. 2B EXEMPLARY LOCATION/SUB-LOCATION SYSTEM ARCHITECTURE

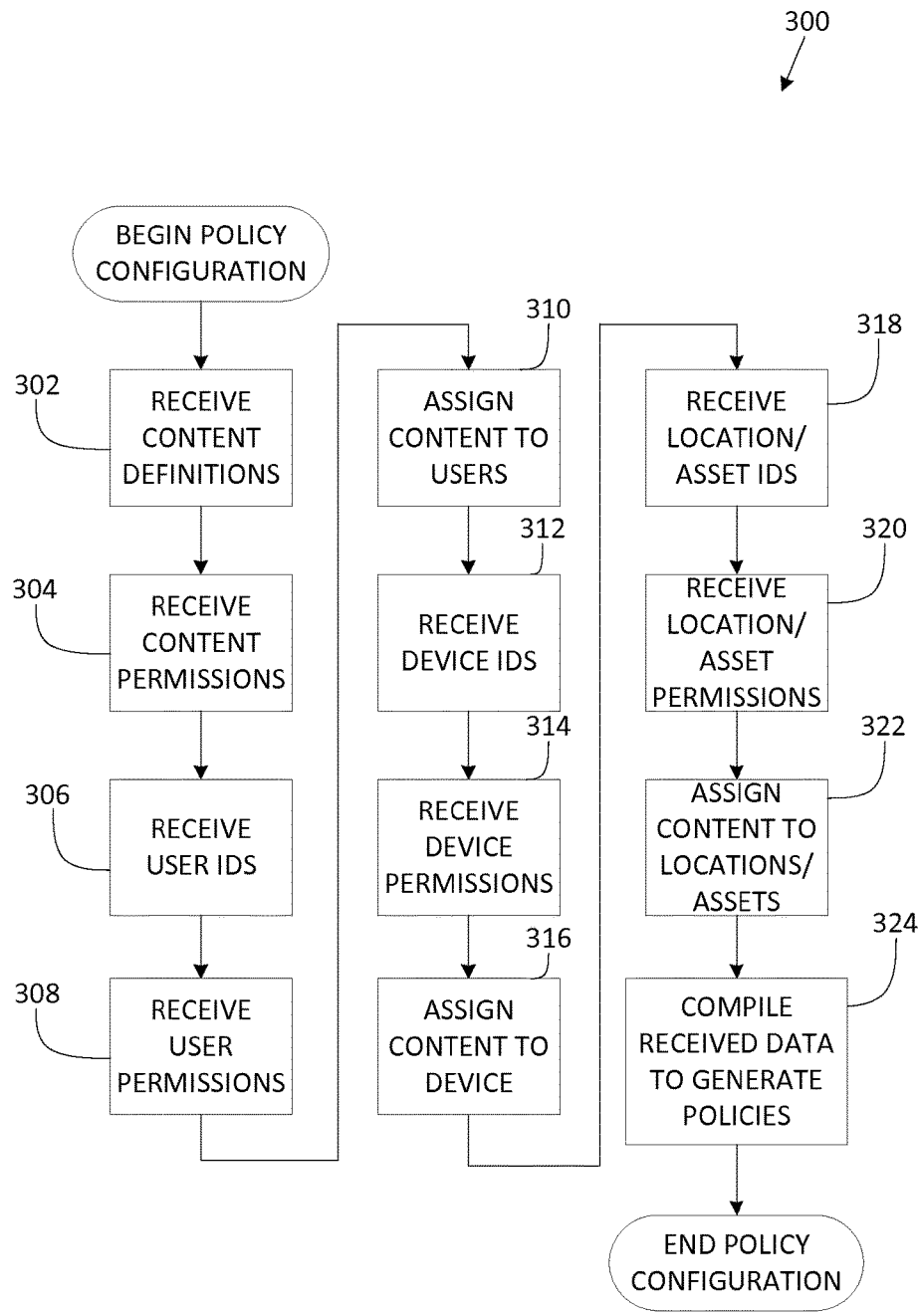
FIG. 3 EXEMPLARY POLICY CONFIGURATION PROCESS

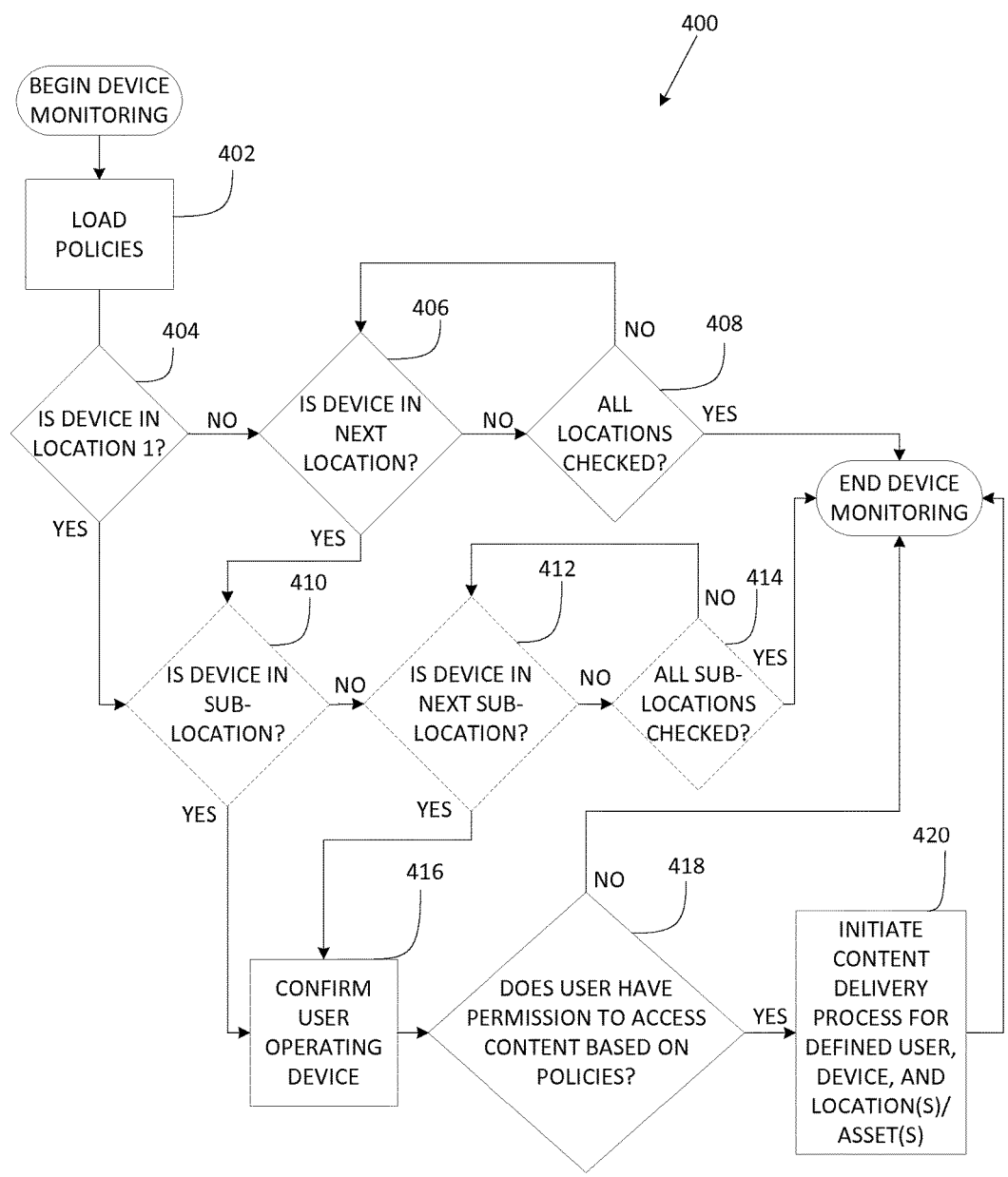
FIG. 4 EXEMPLARY DEVICE MONITORING PROCESS

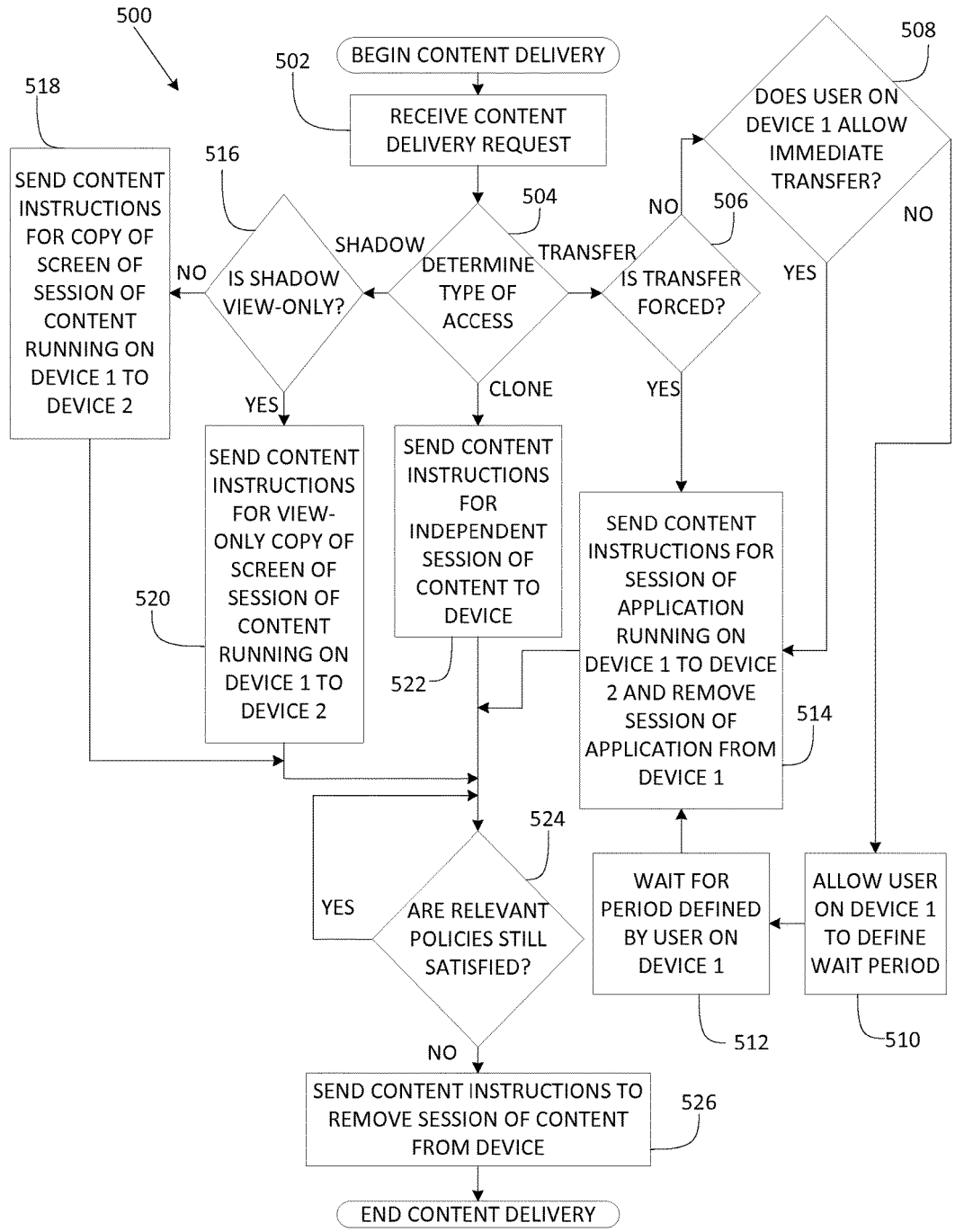
FIG. 5 EXEMPLARY CONTENT DELIVERY PROCESS

FIG. 6A EXEMPLARY POLICY DATABASE SCHEMA

| User | Position | Device | Content | Location | Action | Manager Approval Required? (Priority) |
|---|---|---|---|---|---|---|
| 1 | CEO | A | Application 1 & 2 | 1 | All | No |
| 1 | CEO | A | Applications 1, 2, & 3 | 2 | All | No |
| 2 | Engineer Class 1 | B | Application 1 | 1 | Clone | Yes |
| 3 | Engineer Class 1 | B | Application 2 | 1 | Transfer | Yes |
| 4 | Engineer Class 2 | C | Application 3 | 2 | Shadow | No |
| 5 | Engineer Class 2 | D | Application 3 | 2 | Shadow | No |

FIG. 6B EXEMPLARY APPLICATION DATABASE SCHEMA

| Application | Current User | Current Device | Current Location |
|---|---|---|---|
| 1 | 1 | A | 1 |
| 2 | 3 | B | 1 |
| 3 | 4 | C | 2 |
| 3 | 5 | D | 2 |

SYSTEMS AND METHODS FOR AUTOMATED ACCESS TO RELEVANT INFORMATION IN A MOBILE COMPUTING ENVIRONMENT

CROSS REFERENCE TO RELATED APPLICATION

This application claims priority to and benefit under 35 U.S.C. § 119(e) of U.S. Provisional Patent Application No. 61/906,629, filed Nov. 20, 2013, and entitled "Methods and Systems for Automated Access to Relevant Information in a Mobile Computing Environment," which is incorporated herein by reference as if set forth herein in its entirety.

TECHNICAL FIELD

The present systems and methods relate generally to content delivery and access, and more particularly to methods and systems that permit access to content on a mobile computing device based on a user's and/or device's physical location. In one embodiment, content is delivered to specific users on specific devices in specific physical locations based on policies defined by a system administrator.

BACKGROUND

With the proliferation of mobile computing devices, location-based access to content on these devices cannot be readily physically controlled. In a traditional personal computing architecture, stationary computers are placed in a facility at specific locations and users can access information on the computers via some type of application software. Because these computers are stationary, the applications can be specific to the location of the computer and access to these applications can be physically controlled (e.g., by locking the door to a room that houses a stationary computer). In contrast, access to mobile computing devices usually cannot be easily physically controlled. Thus, users of mobile computing devices can generally use applications installed on the mobile computing devices, which for various reasons should be used only in certain physical locations, in any location where the mobile computing device can be transported. This inability to control the location from where a user is accessing an application can lead to risks and inefficiencies. For example, if a machine on an assembly line is operated over a network by a software application running on a tablet, it may be desirable to limit access to the software application to instances when the tablet is in close physical proximity to the machine. To allow the operator to operate the machine from some location that is not immediately adjacent to the machine, such as the break room, is risky because the machine could injure someone without its operator's knowledge and is inefficient because the machine could malfunction without its operator's knowledge. Physically restraining the tablet so that it cannot leave the proximity of the machine could potentially eliminate some of those risks and inefficiencies, but that method defeats the purpose of installing the software application on a non-stationary terminal, namely the ability for one device to provide multiple users with access to unlimited types of content. Further, use of multiple stationary devices (in a manufacturing facility, for example) is costly.

Therefore, there is a long-felt but unresolved need for a system or method that manages content (e.g., software applications) running on mobile computing devices based on some combination of the device's physical location, device type, and user.

BRIEF SUMMARY OF THE DISCLOSURE

Briefly described, and according to one embodiment, aspects of the present disclosure generally relate to methods and systems for providing location-specific access to content on mobile computing devices. According to one embodiment, a user on a mobile computing device can access certain content only when that user and device are in a specific location. Usually, the user's and/or device's location is determined by its spatial proximity to some form of sensor or sensors. These sensors include but are not limited to Bluetooth beacons, WIFI positioning systems, Global Position Systems, near field communications, Quick Result Codes, Indoor Position Systems, etc. Examples of content that may be accessed by the user and device include but are not limited to files, software applications, IP cameras, terminal server connections, etc., or any variant, sub-part, portion, or combination thereof. In one embodiment, the content to be accessed is related to a physical asset located in or near where the user and/or device are located.

As will be described in greater detail herein, aspects of the disclosed system include a control-server comprising proprietary server software, a content server for managing and delivering various forms of content, one or more mobile computing devices installed with proprietary device software, and one or more sensors. As will be understood, the present disclosure does not impose any limitations on the type or other specifics of the content operating on the content server, the mobile computing devices installed with the proprietary device software, or the sensors.

According to an aspect of the present disclosure, the disclosed system automatically provides access to relevant content to the user of a computing device based on the user's and/or the device's location in accordance with a predefined, centralized configuration. The disclosed system may allow the content to be provided automatically without any decision by the user on whether it is pertinent to the user's current location. The system may, in one or more embodiments, limit or permit access to information based on who the user is, the device the user is operating, and/or the current location of the user. Generally, the content is provided based on one or more predetermined policies that dictate delivery of the content.

A particular example may be useful. In this example, two users, users P and T, work for a company that has deployed at least some of the systems and methods described herein to automatically allow those users to access certain content. Continuing with this example, the two users each have their own mobile computing device, a phablet and tablet, respectively. An administrator, who works for the company in this example, has set up a policy that defines two physical locations in which the users can receive content, location 25 and sub-location 15. Continuing with this example, when the users move into location 25, they receive the content assigned to that location. When the users move from location 25 into sub-location 15, in this example, they receive the content assigned to that second location. In this example, sub-location 15 is associated with a particular asset, asset 13. Continuing with this example, location 25 contains a stationary terminal, terminal 23, that is also assigned to receive certain content. In this example, if the users leave either location, then they will no longer be able to access the content assigned to that location on their mobile computing devices.

Furthermore, according to yet other aspects of the present disclosure, the disclosed system is responsible for identifying the user by any suitable authentication mechanism, such as, for example, by a manual logon, by the scan of an identification badge, and/or by a fingerprint scan.

In one embodiment, a method for delivery of content to mobile devices within a system, comprising the steps of: receiving policy configuration data at a central server, the policy configuration data defining one or more policies for delivery of content to one or more mobile devices within the system, wherein the policy configuration data includes asset data defining at least one physical asset within the system and user role data corresponding to users of the one or more mobile devices; receiving mobile device location data at the central server indicating a specific physical location of a particular mobile device within the system; comparing the received mobile device location data to the policy configuration data to determine whether the specific physical location of the particular mobile device is within a predefined spatial proximity of the at least one physical asset; receiving user profile data at the central server indicating a particular user operating the particular mobile device; comparing the received user profile data to the policy configuration data to determine whether the particular user operating the particular mobile device satisfies a preexisting criteria corresponding to the user role data; and upon determination that the particular mobile device is within the predefined spatial proximity of the at least one physical asset and that the particular user operating the particular mobile device satisfies the preexisting criteria corresponding to the user role data, initiating instructions via the central server for delivery of particular content associated with the at least one physical asset to the particular mobile device.

In another embodiment, a method for delivery of content to mobile devices in a system, comprising the steps of: receiving policy configuration data at a central server, the policy configuration data defining parameters for delivery of content to one or more mobile devices within the system, wherein the policy configuration data includes location data defining at least two physical locations within the system and user role data corresponding to users of the one or more mobile devices; receiving a first set of location data at the central server indicating a first physical location of a particular mobile device; receiving a second set of location data at the central server indicating a second physical location of the particular mobile device; receiving user profile data at the central server indicating a particular user operating the particular mobile device; comparing the received first set of location data, the received second set of location data, and the received user profile data to the policy configuration data to determine whether the first physical location and the second physical location of the particular mobile device and the user profile data satisfy one or more preexisting criteria corresponding to the at least two physical locations and the user role data; and upon determination that the first physical location and the second physical location of the particular mobile device and the user profile data satisfy one or more preexisting criteria corresponding to the at least two physical locations and the user role data, initiating instructions to enable the particular mobile device to access particular content associated with the at least two physical locations.

In yet another embodiment, a system for delivery of content to mobile devices, comprising: an electronic database that stores policy configuration data defining one or more policies for delivery of content to one or more mobile devices within the system, wherein the policy configuration data includes asset data defining at least one physical asset within the system and user role data corresponding to users of the one or more mobile devices; and a processor operatively coupled to the electronic database and configured to: receive mobile device location data indicating a specific physical location of a particular mobile device within the system; retrieve the policy configuration data from the electronic database; compare the received mobile device location data to the policy configuration data to determine whether the specific physical location of the particular mobile device is within a predefined spatial proximity of the at least one physical asset; receive user profile data at the central server indicating a particular user operating the particular mobile device; compare the received user profile data to the policy configuration data to determine whether the particular user operating the particular mobile device satisfies a preexisting criteria corresponding to the user role data; and upon determination that the particular mobile device is within the predefined spatial proximity of the at least one physical asset and that the particular user operating the particular mobile device satisfies the preexisting criteria corresponding to the user role data, initiate instructions for delivery of particular content associated with the at least one physical asset to the particular mobile device.

In another embodiment, a system for delivery of content to mobile devices, comprising: an electronic database that stores policy configuration data defining one or more policies for delivery of content to one or more mobile devices within the system, wherein the policy configuration data includes location data defining at least two physical locations within the system and user role data corresponding to users of the one or more mobile devices; and a processor operatively coupled to the electronic database and configured to: receive a first set of location data at the central server indicating a first physical location of a particular mobile device; receive a second set of location data at the central server indicating a second physical location of the particular mobile device; retrieve the policy configuration data from the electronic database; receive user profile data at the central server indicating a particular user operating the particular mobile device; compare the received first set of location data, the received second set of location data, and the received user profile data to the policy configuration data to determine whether the first physical location and the second physical location of the particular mobile device and the user profile data satisfy one or more preexisting criteria corresponding to the at least two physical locations and the user role data; and upon determination that the first physical location and the second physical location of the particular mobile device and the user profile data satisfy one or more preexisting criteria corresponding to the at least two physical locations and the user role data, initiate instructions to enable the particular mobile device to access particular content associated with the at least two physical locations.

According to one aspect of the present disclosure, the policy configuration data is predefined by a system operator via a management dashboard operatively connected to the central server. The policy configuration data also includes device configuration data defining one or more mobile device types capable of operating content.

According to another aspect of the present disclosure, the method further comprising the steps of: receiving mobile device data at the central server defining a particular mobile device type of the particular mobile device being used by the particular user; comparing the received mobile device data to the policy configuration data to determine whether the particular mobile device type satisfies the one or more mobile device types capable of operating content; and upon determination that the particular mobile device type satisfies the one or more mobile device types capable of operating content, retrieving the particular content for delivery to the particular mobile device as a function of the particular mobile device type.

According to yet another aspect of the present disclosure, the particular content comprises a software application, and the software application comprises functionality related to operation of the at least one physical asset. The particular content also comprises information about the at least one physical asset and access to a terminal server session between the particular mobile device and a remote server.

According to an aspect of the present disclosure, the preexisting criteria corresponding to the user role data comprises a permission for the particular user to access the particular content.

Additionally, in one aspect of the present disclosure, the step of initiating instructions via the central server for delivery of the particular content associated with the at least one physical asset to the particular mobile device further comprises the step of: transmitting a request to the particular mobile device from the central server to establish a terminal server session between the particular mobile device and the central server; receiving an acceptance of the request from the particular mobile device at the central server; and initiating the terminal server session between the particular mobile device and the central server.

In one aspect of the present disclosure, the instructions for delivery of the particular content to the particular mobile device are selected from the group comprising: instructions to transfer the particular content from a preexisting device to the particular mobile device, instructions to initiate a shadow instance of the particular content, and instructions to initiate a clone of the particular content as represented on a preexisting device on the particular mobile device. Moreover, the instructions to transfer the particular content from a preexisting device to the particular mobile device further comprise the steps of: removing access to the particular content from the preexisting device; and delivering access to the particular content on the particular mobile device.

In another aspect of the present disclosure, the at least one physical asset comprises a machine. Also, the first physical location and the second physical location of the particular mobile device are overlapping; the first physical location and the second physical location of the particular mobile device are the same; the first physical location and the second physical location of the particular mobile device are different. Additionally, the second set of location data indicating the second physical location of the particular mobile device is used as a confirmation check that the particular mobile device is within a predefined spatial proximity of the first physical location.

According to an aspect of the present disclosure, the one or more preexisting criteria comprise one or more spatially-defined regions relating to the first physical location and the second physical location. Furthermore, the one or more preexisting criteria are satisfied only when the particular mobile device is present in the one or more spatially-defined regions corresponding to the first physical location and the second physical location. In addition, the one or more spatially-defined regions comprise one or more geofences around a physical asset.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment.

FIG. 1 shows an exemplary block diagram of the overall system architecture according to a particular embodiment of the present system.

FIG. 2 (consisting of FIGS. 2A and 2B) shows architectural details of an exemplary system comprising the processes and various data inputs and outputs according to at least one embodiment, which may be executed by one or more of the elements of the system architecture depicted in FIG. 1.

FIG. 3 is a flowchart showing an exemplary policy configuration process according to one embodiment of the present system.

FIG. 4 is a flowchart showing an exemplary device monitoring process according to one embodiment of the present system.

FIG. 5 is a flowchart showing an exemplary content delivery process according to one embodiment of the present system.

FIG. 6 (consisting of FIGS. 6A and 6B) shows exemplary database schemas according to one embodiment of the present system.

DETAILED DESCRIPTION

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In the following text, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

Aspects of the present disclosure generally relate to methods and systems for providing location-specific access to content on mobile computing devices. According to one embodiment, a user on a mobile computing device can access certain content only when that user and device are in a specific location. In one embodiment, the user's and/or device's location is determined by its spatial proximity to some form of sensor or sensors, or via a remote positioning technology. These sensors and positioning technologies include but are not limited to Bluetooth beacons, WIFI positioning systems, Global Position Systems, near field communications, Quick Result Codes, Indoor Position Systems, etc. Examples of content that may be accessed by the user and device include but are not limited to files, data, software applications, IP cameras, terminal server connections, etc., or any variant, sub-part, portion, or combination thereof. In one embodiment, the content to be accessed is related to a physical asset located in or near where the user and/or device are located.

As will be described in greater detail herein, aspects of the disclosed system include a control-server comprising proprietary server software, a content server for managing and delivering various forms of content, one or more mobile computing devices installed with proprietary device software, and one or more sensors. As will be understood, the present disclosure does not impose any limitations on the type or other specifics of the content operating on the content server, the mobile computing devices installed with the proprietary device software, or the sensors. Aspects of the present disclosure are similarly not limited to the specific architecture described herein, and it will be understood and appreciated that various types and arrangements of servers, sensors, databases, and computing devices may be used to implement the processes and functionality of the present system.

According to an aspect of the present disclosure, the disclosed system automatically provides access to relevant content to the user of a computing device based on the user's and/or the device's location in accordance with a predefined, centralized configuration. The disclosed system may allow the content to be provided automatically without any decision by the user on whether it is pertinent to the user's current location. In particular, the system may provide access to relevant content to the mobile device of a user without the user actively installing or initiating the content on his or her device (e.g., the access to content may be made, in some embodiments, automatically without the user's active initiation of the same). In other embodiments, the user may initiate some action to receive the content, such as scanning a QR code, initiating a request for the content, etc. The system may, in one or more embodiments, limit or permit access to information based on the user's identity, the device the user is operating, and/or the current location of the user. Generally, the content is provided based on one or more predetermined policies that dictate delivery of the content.

Provided immediately below is a specific and non-limiting discussion example of one use case of an embodiment of the present system. This discussion example is not intended to be limiting in any regard, but is instead intended to illustrate one particular functionality of an embodiment of the present system sand methods. In this example, assume two users, users P and T, work for a company that has deployed an embodiment of the systems and methods described herein to automatically allow those users to access certain content. Continuing with this example, the two users each have their own mobile computing device, a phablet (i.e., combination phone and tablet computer) and tablet, respectively. An administrator, who works for the company in this example, has set up a policy that defines two physical locations in which the users can receive content, location 25 and sub-location 15. Continuing with this example, when the users move into location 25, they receive the content assigned to that location. When the users move from location 25 into sub-location 15, in this example, they receive the content assigned to that second location. In this example, sub-location 15 is associated with a particular asset, asset 13 (e.g., a physical machine). In this example, if the users leave either location, then they will no longer be able to access the content assigned to that location on their mobile computing devices.

Furthermore, according to yet other aspects of the present disclosure, the disclosed system is responsible for identifying the user by any suitable authentication mechanism, such as, for example, by a manual logon, by the scan of an identification badge, and/or by a fingerprint scan. Aspects of the present system are user-specific, so that multiple users can use a device but have access only to content assigned to that specific user. Further, the system is generally device-specific, so that a particular user can only access content assigned to that user on certain devices that are also assigned to that user. Also, embodiments of the system are location-specific, so that users can only access content on their assigned devices in certain locations. The system generally also automatically provides access to content without a specific, active user trigger (e.g., a request for download).

Additionally, in one embodiment, the system does not place limitations on the type of content that it can deliver. Instead, the system is able to deliver access to files, applications, IP cameras, terminal server connections, etc. Moreover, the system generally accommodates a variety of locations, so that content can be delivered when the mobile device is in a room, building, city block, city, in physical proximity to an asset, within a defined geofence, etc. The system also generally accommodates diverse types of computing devices, whether mobile or stationary. Finally, the system can be easily expanded and adjusted to allow for changes to the various configurations of which content users can access in different locations on various devices.

Exemplary Embodiment

Referring now to the figures, FIG. 1 illustrates an overview 10 of one embodiment of the present system 100 for providing location-specific access to content on mobile computing devices. Details of providing location-specific access to content on mobile computing devices will be better understood in connection with the discussion of FIGS. 2-7, described in greater detail below.

As shown in FIG. 1, the system 100 comprises, in one embodiment, a control server 102, a content server 104, and a database 106. One skilled in the art will appreciate that the system 100 is not limited to the configuration in FIG. 1, but can be any combination of servers, databases, and/or other computing components necessary to carry out the functions of the system 100.

Still referring to FIG. 1, generally, administrator 3 inputs data into a configuration computer 1 that populates policies for providing access to content. For example, these policies can define what content is delivered to user P 11 and user T 7 in location 25 on phablet 9 and tablet 5, respectively. Generally, an administrator may be an employee at a company that is utilizing an embodiment of the present system, or an administrator working for a vendor supplying the present system, or any other entity with the need and/or authority to create content access policies for system users. The policies are then sent to the control server 102 for subsequent use. This policy configuration process will be explained in more detail in conjunction with the descriptions of FIGS. 2 and 3.

In one embodiment, the control server 102 monitors the location of mobile devices (such as tablet 5 and phablet 9) through a monitor connection 19, which operates on a network 17. The control server 102 generally also monitors, through a monitor connection 19, the users (such as user T and user P) operating the mobile devices. The monitor connection 19, generally, is constantly communicating over a network 17 between the control server 102 and a mobile device. Generally, the monitor connection 19 can be the same connection for each mobile device or can be many different connections operating simultaneously; the monitor connection 19 provides the control server 102 with the relevant data from the mobile devices that the control server 102 needs to determine whether certain policies are satisfied. For example, when user P operating phablet 9 moves into location 25, the control server 102 receives data from phablet 9 through the monitor connection 19 and generally enables access (according to predefined policies), on phablet 9, to content running on content server 104 through a content connection 21, which also operates over a network 17. One skilled in the art will appreciate that location 25 can be any physical location including, but not limited to, a room, building, city block, city, predefined geo-fence, coordinate location, etc. Additionally, when user T moves into sub-location 15, the content server generally enables access to content running on the content server 104 through a content connection 21 (again, assuming a policy is satisfied). Generally, the content connection 21 can be the same connection for each mobile device or can be many different connections operating simultaneously. Generally, the content delivered to user T in sub-location 15 can be different from or the same as the content delivered to user P in location 25. In one embodiment of the disclosure, sub-location 15 is associated with asset 13 so that it is located in spatial proximity to asset 13 and provides content necessary to operate, repair, etc. asset 13. This process will be explained in more detail in conjunction with the descriptions of FIGS. 2, 4, and 5.

As suggested by the description of FIG. 1 and other descriptions herein, it is sometimes necessary or helpful for users to be able to access certain electronic content (e.g., software applications, data tables, etc.) that may be necessary to operate, manage, repair, monitor, test, etc. certain physical assets (e.g., machines, operating devices, surgical equipment, emergency equipment, power systems, etc.). Further, for certain security reasons or other reasons, it may be helpful for the content to only be available to a user while he or she is within a predefined physical proximity to the given asset. Thus, aspects of the present disclosure can provide access (and similarly disable access) to relevant content to users operating certain mobile computing devices (e.g., tables, phones, phablets, laptop computers, PDAs, etc.) based on those users' physical proximity to such an asset, and/or the user's role (e.g., security clearance), the type of device the user operates, and the like.

One skilled in the art will appreciate that the present system 100 does not place any limitations on the mobile computing devices usable within the system, and these devices can be any computing device including, but not limited to, a phone, tablet, laptop, desktop, etc. In another embodiment of the present disclosure, the control server 102 monitors, through a monitor connection 19, a stationary terminal, such as terminal 23 in location 25. Generally, this ability to monitor stationary terminals as well as mobile computing devices allows the present system 100 to be easily integrated into a company's current operations. For example, a stationary (non-mobile) computing terminal may be helpful in some scenarios. Further, in one embodiment, a user can confirm his or her location by interacting his/her mobile device with the stationary terminal. For example, the user might scan a QR code displayed on the stationary terminal with the user's mobile device to confirm that the user is within the proximity of the stationary terminal (and asset), to act as a location confirmation check, and/or to then receive the relevant content. In the embodiment shown in FIG. 1, the control server 102 enables access on terminal 23 to content operating on a content server 104 through a content connection 21.

In yet another embodiment of the disclosure, a given policy can be configured so that when user T moves into location 25 and then into sub-location 15, the control server 102 enables access to content running on the content server 104 through the content connection 21. One skilled in the art will appreciate that the content accessed in sub-location 15 generally can be related to an asset, such as asset 13. In one embodiment, content running on the content server 104 and accessed through the content connection 21 is not in any way limited to a certain type of content and can be files, applications, IP cameras, terminal server connections, etc. This process will be explained in more detail in conjunction with the descriptions of FIGS. 2, 4, and 5.

The discussions above in association with FIG. 1 merely provide an overview of an embodiment of the present methods and systems for providing location-specific access to content on mobile computing devices. In alternate embodiments, the content can be computer files, software applications, IP cameras, terminal server connections, etc. Additionally, location 25 and sub-location 15 do not have to be concentric and can be, for example, adjacent, overlapping, etc.

FIG. 2 (consisting of FIGS. 2A and 2B) illustrates an exemplary block diagram 200 showing the flow of data through the processes of the system 100. FIG. 2A generally illustrates the method for providing location-specific access to content on mobile computing devices, wherein a relevant policy contains one physical location (e.g., location 25). FIG. 2B generally illustrates the method for providing location-specific access to content on mobile computing devices, wherein a relevant policy contains a location and a sub-location (e.g., location 25 and sub-location 15, respectively). As will be understood by one of skill in the art, any number of physical locations (and sub-locations or secondary locations) are possible within aspects of the present system, and the location details illustrated in FIG. 2 are not intended to be limiting in any way.

Starting first with FIG. 2A, the policy configuration process 300 (described in greater detail in connection with FIG. 3), in one embodiment, receives several inputs (data entries) from an administrator 3 and then generates policies 212, which define the preexisting criteria that should be satisfied to enable access to the content 218. These inputs include, but are not limited to, location/assets IDs 202, device IDs 204, user IDs 208, content data 210, other inputs 206, etc. In one embodiment, the policies are defined by an administrator, such as administrator 3, but are electronically generated by the policy configuration process 300.

Generally, the location/asset IDs 202 identify a particular physical location or asset and are compiled into a list of known physical locations or assets within the system. In one embodiment, these locations are not limited in their size or type and can be assets within a room, rooms within a buildings, buildings, city blocks, cities, etc. Additionally, assets are not usually limited in their size, type, location, etc. and can be physical machines, landmarks, furniture, virtual locations, etc. In one embodiment of the system 100, the location/asset IDs 202 are also associated with one or more sensor IDs 230 corresponding to location-identification sensors that are often physically tied to the assets. In one embodiment, these sensors provide confirmation to the system that a device is within a certain spatial proximity to the location 25/asset 13. The device IDs 204 usually identify each of the mobile computing devices within the system but can also correspond to a stationary computing device or terminal, as the system places no constraints on the type of device to which it can enable access to the content 218. The user IDs 208 generally include data that identifies users in the system. Additionally, the user IDs 208 generally also include data that identifies the role of each user in the system. One skilled in the art will appreciate that by defining a user's role, the policy can be more broadly applied to a group of users and more easily changed when necessary. The content data 210 generally includes data that identifies each instance of content 218 that may be delivered to (or is accessible by) mobile devices of system users. In one embodiment, the content data 210 is compiled to form a list of all of the available content running on the content server 104.

As will be understood from the descriptions subsequently herein, in policy configuration process 300, the administrator 3 matches the content data 210 to the specific location/asset IDs 202, so that certain content 218 will usually be available to users when they are in spatial proximity to such assets (or physical locations related to such assets). In one embodiment, the administrator 3 also pairs the user IDs 208 and the device IDs 204 so that specific devices 226 are tied to or associated with certain users. Finally, in one embodiment, the administrator 3 associates the users IDs 208 and the device IDs 204 with the content data 210 and the location/asset IDs 202. These pairings are criteria that result in policies 212 and provide preexisting criteria that should be satisfied to enable access to content on the device(s) 226. For example, the administrator 3 could pair the user ID 208 for User P with the device ID 204 for phablet 9 so that User P can only access content 218 on phablet 9. Additionally, the administrator 3 could pair the user ID 208 for User P and the device ID 204 for phablet 9 with the location/asset ID 202 for location 25 so that User P can only access content 218 on phablet 9 in location 25. The policy configuration process 300 will be better understood in conjunction with FIG. 3.

Still referring to FIG. 2A, the policies 212 are generated by the policy configuration process 300 and used by the device monitoring process 400. The device monitoring process 400 (discussed exemplarily in connection with the discussion of FIG. 4) is the process by which the system 100 determines whether a device 226 has satisfied the preexisting criteria that generally are contained within the policies 212 for delivering or providing access to certain content 218. The device monitoring process 400 receives the device data 220. In one embodiment, the device data 220 contains the user IDs 224 and other information about the device and its user. The user IDs 224 generally provide a unique way to identify the user. The system places no limitations on the methods for identifying the users, which can be through fingerprint scans, manual logons, ID badge scans, etc. The sensor ID(s) 230 generally provide unique identification of the sensor(s) 228, which are used to identify the present of a given mobile device in spatial proximity to physical locations, such as asset 13 and/or location 25. The system 100 places no limitations on the types of sensor(s) 228 that can be used. Examples of sensors 228 include, but are not limited to, Bluetooth beacons, WIFI positioning systems, Global Position Systems, near field communications, Quick Result ("QR") Codes, Indoor Position Systems, etc. In one embodiment, the device data 220 identifies to the system which user is operating the device(s) 226 and whether the device(s) 226 is located within a predefined geographic range, or is in certain spatial proximity to the location 25 or asset 13. The device monitoring process 400 compares the data from the device data 220 to determine whether the preexisting criteria of the policies 212 have been satisfied.

For example, assume that user P scans, with phablet 9, a QR code that is affixed to asset 13. Phablet 9 receives the sensor ID 230 from the scan of the QR code and transmits that data, along with user P's user ID 224, to the control server 102 in the device data 220. The control server parses the device data 220 in the device monitoring process 400 to determine the user ID 224, sensor ID 230 (e.g., via the QR code), and device 226 that sent the device data 220. The control servers compares the user ID 224 and the sensor ID 230 (obtained through the QR code) to the policies 212 to determine which user is operating the device 226 (from the user IDs 208), in what location that user is operating the device 226 (from the location/asset IDs 202), and whether that user and device 226 should receive access to content 218 in that location as defined by the policies.

In one embodiment, if the preexisting criteria have been satisfied, then a content delivery request 214 is provided to the content delivery process 500, which will be explained in further detail in the description of FIG. 5. In one embodiment, the content delivery request 214 contains information identifying the specific user, device 226, content 218, location 25/asset 13, etc. From the data in the content delivery request 214, the content delivery process 500 determines the type of content instructions 222 to provide to the device(s) 226 and sends the content instructions 222 to the device(s) 226 in accordance with the predefined policies; these content instructions 222 contain data sufficient to enable access on the device(s) 226 to content 218 running on a content server 104. In one embodiment, there are various different types of content instructions 222 relating to different types of content access (transfer, force transfer, shadow, view-only shadow, clone, etc.); the differences between these types of content instructions 222 and content access will be explained in the description of FIG. 5. These types of content access permit multiple users to operate the same content on multiple devices. The content instructions 222 enable access on the device(s) 226 to content 218 running on a content server 104. In one embodiment, the content instructions 222 are sent to the content server 104 (instead of directly to the device 226) to manage delivery of the content to the device.

Now referring to FIG. 2B, a method is shown for providing location-specific access to content on mobile computing devices, wherein a relevant policy contains a location and a sub-location (e.g., location 25 and sub-location 15, respectively). As shown, FIG. 2B is virtually identical to FIG. 2A, except that FIG. 2B relates to an exemplary scenario with two locations, location 25 and sub-location 15, whereas FIG. 2A pertains to a scenario with only one location. Accordingly, except as discussed below, the discussion of FIG. 2A also applies to FIG. 2B. As will be understood and appreciated, the data flow examples shown in FIGS. 2A and 2B are provided for illustrative purposes only, and scenarios with a plurality of locations and many sub-locations are possible within aspects of the present disclosure.

In one embodiment, when the administrator 3 inputs the location/asset IDs 202, those location/asset IDs 202 are associated with one or more sensor IDs 234 and 238 corresponding to location-identification sensors 232 and 236 that are often physically tied to the assets. These sensors provide confirmation to the system that a device is within a certain spatial proximity to the location 25 or sub-location 15/asset 13, respectively. Generally, the location 25 and sub-location 15 do not have to be concentric and can be, for example, adjacent, overlapping, etc. The sensor IDs 234 and 238 are included in the device data 220 that the device(s) 226 transmits to the control server 102.

As will be understood from the descriptions subsequently herein, in one embodiment of the policy configuration process 300, the administrator 3 matches content data 210 to the specific location/asset IDs 202 for the location 25 and sub-location 15, so that certain content will be available to users when they have first been in spatial proximity to a physical location 25 and have then entered a sub-location 15, which is associated with an asset 13. This pairing is known as a policy 212 and provides preexisting criteria that should be satisfied to enable access to content on the device(s) 226.

Turning now to FIG. 3, a flowchart representing an exemplary policy configuration process 300 is shown for configuring policies that determine access to content 218. Generally, aspects of the policy configuration process 300 are used to create, from the inputs (data) of an administrator 3, a set of preexisting criteria for comparison with mobile device data (e.g., current states of mobile devices) to determine whether to enable access to content 218. As will be further understood and appreciated, the steps of policy configuration process 300 shown in FIG. 3 (and those of all other flowcharts shown and described herein) may operate concurrently and continuously, are generally asynchronous and independent, and are not necessarily performed in the order shown.

Starting with step 302, the system 100 receives content definitions as part of the content data 210. These content definitions generally provide identifying information for content 218 available through the content server 104. The identifying information can include the types of content 218 (e.g., computer files, software applications, IP cameras, terminal server connections, etc.), locations to which content is associated, etc. At step 304, the system receives content permissions for the content defined at step 302. These permissions generally include the types of users that should be able to access content 218, the types of devices that the users should be able to operate to access content 218, the types of locations at which the users should be able to access content 218, the type of access through which users should be able to access content 218, time-based restrictions for content access, and any other type of content permission as will be understood by one of skill in the art. In one embodiment, there are various different types of content instructions 222 (e.g., transfer, force transfer, shadow, view-only shadow, clone, etc.); the differences between these types of access will be explained in the description of FIG. 5.

Still referring to FIG. 3, at step 306, the system 100 receives user information (e.g., user IDs 208). The user IDs 208 can include data that identifies one or more users in the system. Additionally, the user IDs 208 can generally also include data that identifies the role of each user in the system. Next, at step 308, the system 100 receives user permissions. These permissions generally include types of content 218 that the users should be able to access, types of locations at which the users should be able to access content 218, the type of access through which the users should be able to access content 218, and the types of devices 226 that the users should be able to operate. Generally, the user permissions are rules or policies tied to specific system users that dictate how and when they will be able to access content via their mobile computing devices. At step 310, the system 100 assigns content 218 to users based on the policies (e.g., the content permissions, content definitions, and user permissions). These assignments usually specify which content 218 a certain user can access and what types of access the user will have to content 218; generally, these assignments promote computational efficiencies in the device monitoring process 400 and content delivery process 500 by essentially pre-assigning which content 218 a user can access at a later time.

At step 312, the system 100 receives device information (e.g., device IDs 204). In one embodiment, the device IDs 204 include data that identifies one or more mobile computing devices 226 in the system. The device IDs 204 usually identify each of the mobile computing devices within the system and provide relevant information about the same (e.g., device type, model, etc.). In one embodiment, the device IDs also correspond to a stationary computing device or terminal as the system places no constraints on the type of device to which it can enable access to content 218. Next, at step 314, the system receives device permissions. These permissions generally include types of content 218 that the users should be able to access on devices 226, types of location where the users should be able to access content 218 on devices 226, the types of access through which the users should be able to access content 218 on devices 226, and the types of users that should be able to operate devices 226. At step 316, the system assigns content 218 to devices 226 based on the policies (e.g., the content permissions, content definitions, and user permissions). For example, phablet 9 and tablet 5 could have different security measures. If content 218 is especially sensitive, in one embodiment it can only be accessed on the mobile computing device with the more robust security measures (e.g., fingerprint scanning technology to confirm the user), so it would be assigned by the system 100 accordingly. These assignments usually specify which particular content 218 a certain user can access on a device 226 and what types of access the user will have to that content 218 on that device 226.

Continuing with step 318 of FIG. 3, the system receives location/asset information (e.g., location/asset IDs 202). The location/asset IDs 202 generally identify a particular physical location or asset within the system. One skilled in the art will appreciate that these locations are not limited in their size or type and can be assets within a room, rooms within a buildings, buildings, city blocks, cities, etc. and can also be granular, down to a few feet or specific map coordinates. Additionally, assets are not usually limited in their size, type, location, etc. and can be physical machines, landmarks, furniture, virtual locations, etc. In one embodiment of the system 100, the location/asset IDs 202 are also associated with one or more sensor IDs 230 corresponding to location-identification sensors physically located at or near certain locations. These sensors usually provide confirmation to the system that a device is within a certain spatial proximity to the location 25 and/or asset 13. Next, at step 320, the system receives location/asset permissions. These permissions generally included types of content 218 that the user should be able to access on devices 226 in the specific locations, types of users that should be able to access content 218 on devices 226 in the specific locations, and the types of access through which the users should be able to access content 218 on devices 226 in the specific locations. At step 322, the system 100 assigns content 218 to locations/assets. These assignments usually specify which particular content 218 a certain user can access on a certain device 226 in that location(s) and what types of access the user will have to content 218 on that device 226 in that location(s); generally, these assignments promote computational efficiencies in the device monitoring process 400 and content delivery process 500 by essentially pre-assigning which content 218 a user will access.

At step 324, the system compiles all of the received information (also referred to herein as "policy configuration data"), including, but not limited to, the content definitions and permissions, user IDs and permissions, device IDs and permissions, location/asset IDs and permissions, etc., to create the policies 212. These policies and their associated received information, in one embodiment, provide the pre-existing criteria that generally should be satisfied to enable access to content on the device(s) 226. After the policies have been generated, the policy configuration process ends.

Now referring to FIG. 4, an exemplary device monitoring process 400 is shown for monitoring mobile computing devices 226 to enable access to content 218 by the computing device. In one embodiment, the process 400 occurs via the control server 102, and the content is operated via the content server 104. In other embodiments, a central server performs the relevant steps, and any other types of servers and/or processors can be utilized to perform the described functionality. At step 402, the system (e.g., the control server 104) loads the policies 212 that are generated via the policy configuration process 300. Generally, these policies contain the preexisting criteria that the control server 104 will compare to the device data 220 to determine whether to enable access to content 218.

At step 404, the control server 104 determines whether a device 226 is in a first location (e.g., location 25) or in spatial proximity to a first asset (e.g., asset 13), which is predefined in the system. If the device 226 is not in a relevant location, then, at step 406, the control server 104 determines whether the device 226 is in a next location in an iterative list of locations in the system. For example, the relevant system may include dozens or hundreds of locations, and thus each location is checked until it is determined whether a given user is within a relevant location. If the device 226 is not in the next location, then, at 408, the control server 104 continues to check additional locations that are predefined in the system, via step 406, until all locations have been checked or the device 226 enters a location. If the control server 104 checks all locations and the device 226 is not in any of the locations, then device monitoring process 400 ends. If the device 226 is in a location 25 or one of the next locations, then the process moves to step 410.

Still referring to FIG. 4, steps 410 through 414 are an optional secondary check of a sub-location or secondary location. Steps 410 through 414 correspond to the exemplary scenario from FIG. 2B. At step 410, the control server 104 determines whether a device 226 has entered a sub-location (e.g., sub-location 15), which is predefined in the system. If the device 226 is not in a sub-location, then the control server 104 determines, at step 412, whether the device 226 is in the next sub-location on the iterative list of sub-locations in the system. If the device 226 is not in the next sub-location, then, at step 414, the control server 104 continues to check additional sub-locations that are predefined in the system, via step 412, until all sub-locations have been checked. If the control server 104 checks all sub-locations and the device 104 is not in any of the sub-locations, then the device monitoring process 400 ends. If the device 226 is in a sub-location or one of the next sub-locations, the process moves to step 416.

One skilled in the art will appreciate that these sub-locations can be but generally do not have to be within a higher level location (e.g., location 25) or any of the other locations checked at steps 404 through 408; in one embodiment, the sub-location can be a different shape from the first location or can be the same location but with different sensors. This optional secondary check of a sub-location provides the system to confirm the mobile computing device's presence at very specific location. For example, if company wants to ensure that user T 7 is standing next to asset 13, which is located in both location 25 (e.g., a building) and sub-location 15 (e.g., an area immediately adjacent to asset 13), then the secondary check can provide this confirmation when user T scans the QR code on asset 13.

Referring still to FIG. 4, at step 416, the control server 104 confirms, from the device data 220, the particular user operating a device 226 by comparing the user IDs 224 within the device data 220 to the user IDs 208 in the policies 212 (loaded at step 402). Next, at step 418, the control server 104 determines whether the user identified at step 416 has permission to access content 218 based on the policies 212 (loaded at step 402). If the user does not have permission, then the device monitoring process 400 ends. If the user does have permission, then, at step 420, the content delivery process 500 (explained in further detail in FIG. 5) is initiated for the identified user, device, and location, per the policies 212. Once the control server initiates the content delivery process 500, then the device monitoring process ends.

Referring now to FIG. 5, a flowchart representing an exemplary content delivery process 500 is shown. Content delivery, generally, can occur through actual delivery of the content to the mobile computing device, through providing access to the mobile computing device to content operating on a server, through terminal server sessions, or via other content delivery mechanisms as will occur to one of ordinary skill in the art.

After receiving content delivery request 214 at step 502 from the device monitoring process 400, the system determines the type of access to content 218 that device 226 should receive at step 504. Generally, in the embodiment shown and described, there are three broad types of access to content 218: transfers, shadows, and clone. Some of these types of access only apply in situations where there is a first device that is operating a software application and a second device that needs to access the software application. A "transfer" usually occurs when a session of a software application is accessed on a first device and that session is transferred to a second device and, therefore, access is removed from the first device. For example, if a user T is at the end of a work shift operating an asset 13 using a software application on a tablet 5 and needs to allow a user P to take over operating the asset 13 without closing the application (which would turn off the machine), then a "transfer" of the software to phablet 9 would allow the machine to continue operating without requiring a user T to leave the tablet 5 with a user P. In certain embodiments, a transfer can be forced, which means that the transferor cannot determine whether and when to transfer the session, which allows a supervisor to take control of an asset when a user is operating it incorrectly.

A "shadow" usually occurs when a session of an application is accessed on a first device and a copy of that session is accessed on a second device, so that the same session of the application is accessed on both devices and users of both devices can both interact with that same session of the application. For example, if a supervisor, such as user P, needs to make corrections to a process that user T is running through a software application on a tablet 5, then a "shadow" allows both users to operate the machine at the same time. In certain embodiments, a shadow is view-only, which means that the user on the second device can view but cannot interact with the session of the application that is accessed on the first device, which allows a supervisor to oversee a user's work without interfering.

Finally, a "clone" occurs when a new session of an application is accessed on a device; at the time of initiation, generally, this session can be, but does not have to be, the only session of the application being accessed anywhere else on the system by any other devices. One skilled in the art will appreciate that while, for clarity's sake, software applications are discussed in the above and below explanations of types of access, the types of access apply to any and all types of content.

In yet further embodiments, rather than a transfer, shadow, or clone, access is simply provided to the relevant mobile device in a straightforward manner. In such an embodiment, the content is either transferred to the device (e.g., via a software application download or transmission of relevant content), or the content is made available by the device via a terminal server session, VPN connection, cloud computing scenario, or other relevant delivery mechanism.

If the control server 102 determines that the type of access to content 218 is a transfer, then, at step 506, the control server 102 determines from the content delivery request whether the transfer is forced. If the transfer is not forced, then at step 508, the control server 102 generally determines whether the user on the first device allows the immediate transfer of the session accessed on the first device. If the user on the first device does not allow an immediate transfer of the session on the first device, then the control server 102 allows the user to define a wait period, at step 510, for the control server to wait before allowing the content transfer. Then, at step 512, the control server 102 waits for the period defined by the user at step 510. After waiting for the wait period or if the transfer is forced or if the user on the first device allows the immediate transfer, at step 514, the control server 102 allows access, on the second device, to the session of an application that is currently accessed on a first device and removes access to that session from the first device.

If the control server 102 determines from the content delivery request that the type of access to content 218 is a shadow, then, at step 516, the control server 102 determines whether the shadow is view-only. If the shadow is not view-only, then, at step 518, the control server 102 allows access, on a second device, to a copy of the screen of a session of an application that is currently accessed on a first device. If the shadow is view-only, then, at step 520, the control server 102 allows access, on the second device, to a copy of the screen of a session of the application that is accessed on the first device that the user of the second device can view but with which the user cannot interact.

If the control server 102 determines from the content delivery request that the type of access to content 218 is a clone, then, at step 522, the control server 102 allows access to a new session of an application on the device.

After either transferring at steps 506 through 514, shadowing at steps 516 through 520, or cloning at step 522, the control server 102 continues to check that the device and user at issue still satisfy the relevant policy relating to delivery of content. One skilled in the art will appreciate that this check can be done by repeating the device monitoring process 400 or some subset of the steps of the device monitoring process 400. As long as the user, device, and location still satisfy the policies 212 and thereby have access to the relevant content, the control server 102 continues to repeat step 524. If the user, device, and/or location no longer satisfy the policies 212, then the control server 102 generates the content instructions 222 to remove access to the session of the application that was accessed on the device at step 526. These content instructions 222 prevent the device 226 from continuing to access the content 218. Once the content instruction to remove access has been generated, the content delivery process 500 ends.

Now referring to FIG. 6 (consisting of FIGS. 6A and 6B), exemplary database schemas 602 and 604 are shown as would be found in a database 106. FIG. 6A displays an exemplary database schema 602 for several exemplary policies. In certain embodiments, the system 100 stores in a database 106 entries for each location 25 or asset 13 defined by an administrator 3. Accordingly, for each location/asset ID 202 in column 616, column 606 contains a user ID 208, which corresponds to a user in the system; column 608 contains the user's role, which allows an administrator to rapidly apply policies across broad groups of users; column 610 contains the device IDs 204 for the devices that the users can operate; column 612 contains the content 218 that the user can access in the location; column 614 contains the types of access to content 218 that the user will be given; and column 618 indicates whether a supervisor approval is required for certain types of access. In other embodiments, the system 100 stores in a database 106 entries for each user or user role defined by an administrator 3. Typical information stored for each location included the users, users' roles, devices, content, access types, and priority that determine access to content.

FIG. 6B displays an exemplary database schema 604 showing the current content sessions operating in the system. Generally, the database 106 contains which content 218 are operating in column 220, which users are operating that content 218 in column 622, on which devices 226 the users are operating that content 218 in column 624, and in which locations the users are operating that content 218 in column 626.

According to certain embodiments of the present disclosure, the functionality of the relevant computing devices is improved. For example, by being able to access relevant content in an automatic and streamlined way, the ability for each mobile device in the system to interact with a relevant, physical machine is improved and made more efficient. Further, the above-described methods have many additional features not present in prior computing devices, as will be made clear by the appended claims.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

The foregoing description of the exemplary embodiments has been presented only for the purposes of illustration and description and is not intended to be exhaustive or to limit the present systems methods to the precise forms disclosed. Many modifications and variations are possible in light of the above teaching. The embodiments were chosen and described in order to explain the principles of the systems and methods and their practical application so as to enable others skilled in the art to utilize the present systems methods and various embodiments and with various modifications as are suited to the particular use contemplated. Alternative embodiments will become apparent to those skilled in the art to which the present systems methods pertain without departing from their spirit and scope. Accordingly, the scope of the present systems methods is defined by the appended claims rather than the foregoing description and the exemplary embodiments described therein.

What is claimed is:

1. A method for delivery of content to mobile devices within a system for controlling a plurality of manufacturing machines, comprising the steps of:
   receiving policy configuration data at a central server,
   the policy configuration data defining one or more policies for delivery of the content to one or more mobile devices within the system,
   wherein the policy configuration data includes
      asset data defining at least one physical asset within the system
      and user role data and second user role data, each corresponding to a role of a group of users of the one or more mobile devices;
   receiving mobile device location data at the central server indicating a specific physical location of a particular mobile device within the system;
   comparing the received mobile device location data to the policy configuration data to determine whether the specific physical location of the particular mobile device is within a predefined spatial proximity of a specific physical asset of the at least one physical asset, the specific physical asset comprising a machine of the plurality of manufacturing machines;
   receiving user profile data at the central server indicating a particular user operating the particular mobile device;
   comparing the received user profile data to the policy configuration data to determine whether the particular user operating the particular mobile device satisfies a preexisting criteria corresponding to the user role data;
   and upon determination that
      the particular mobile device is within the predefined spatial proximity of the specific physical asset
      and that the particular user operating the particular mobile device satisfies the preexisting criteria corresponding to the user role data,
   initiating instructions via the central server for the delivery of particular content associated with the specific physical asset to the particular mobile device;
   wherein the content comprises different content specific to different physical assets, and further comprising an application for creating a session between the particular mobile device and the machine to allow the particular user to control the machine using the particular mobile device via the session;
   and wherein based upon
      the specific physical location of the particular mobile device
      and its proximity to the specific physical asset,
      and the user profile data,
      content is selectively delivered to the particular mobile device indicative of operation of the specific physical asset based upon
         the specific physical location
         and the user role data when the user is one of the group of users;
   receiving second mobile device location data at the central server indicating a second specific physical location of a second particular mobile device within the system;
   comparing the second received mobile device location data to the policy configuration data to determine whether the second specific physical location of the particular mobile device is within a predefined spatial proximity of the specific physical asset;
   receiving second user profile data at the central server indicating a second particular user operating the second particular mobile device;
   comparing the second received user profile data to the policy configuration data to determine whether the second particular user operating the second particular mobile device satisfies a second preexisting criteria corresponding to the second user role data;
   and upon determination that
      the second particular mobile device is within the predefined spatial proximity of the specific physical asset
      and that the second particular user operating the particular mobile device satisfies the second preexisting criteria corresponding to the second user role data,
   initiating instructions by the central server for transferring control of the specific physical asset from the first particular mobile device to the second particular mobile device to allow the second particular user to take control of the machine using a second session between the second particular mobile device and the machine;
   wherein the transferring control comprises
      sending, by the central server, a command to the first particular device to remove access to the session and to the application whereby, in response, the first particular device does not subsequently control the machine.

2. The method of claim 1, wherein the policy configuration data is predefined by a system operator via a management dashboard operatively connected to the central server.

3. The method of claim 1, wherein the policy configuration data includes device configuration data defining one or more mobile device types capable of operating content.

4. The method of claim 3, further comprising the steps of:
   receiving mobile device data at the central server defining a particular mobile device type of the particular mobile device being used by the particular user;
   comparing the received mobile device data to the policy configuration data to determine whether the particular mobile device type satisfies the one or more mobile device types capable of operating content; and
   upon determination that the particular mobile device type satisfies the one or more mobile device types capable of operating content, retrieving the particular content for delivery to the particular mobile device as a function of the particular mobile device type.

5. The method of claim 1, wherein the particular content comprises a software application.

6. The method of claim 5, wherein the software application comprises functionality related to operation of the specific physical asset.

7. The method of claim 1, wherein the particular content comprises information about the specific physical asset.

8. The method of claim 1, wherein the particular content comprises access to a terminal server session between the particular mobile device and a remote server.

9. The method of claim 1, wherein the preexisting criteria corresponding to the user role data comprises a permission for the particular user to access the particular content.

10. The method of claim 1, wherein the step of initiating instructions via the central server for delivery of the particular content associated with the specific physical asset to the particular mobile device further comprises the step of:

transmitting a request to the particular mobile device from the central server to establish a terminal server session between the particular mobile device and the central server;

receiving an acceptance of the request from the particular mobile device at the central server; and initiating the terminal server session between the particular mobile device and the central server.

11. The method of claim 1, wherein the instructions for delivery of the particular content to the particular mobile device are selected from a group comprising: instructions to transfer the particular content from a preexisting device to the particular mobile device, instructions to initiate a shadow instance of the particular content, and instructions to initiate a clone of the particular content as represented on a preexisting device on the particular mobile device.

12. The method of claim 11, wherein the instructions to transfer the particular content from a preexisting device to the particular mobile device further comprise the steps of:
removing access to the particular content from the preexisting device; and
delivering access to the particular content on the particular mobile device.

13. A system for delivery of content to mobile devices within a system for controlling a plurality of manufacturing machines, comprising:
an electronic database that stores policy configuration data defining one or more policies for delivery of content to one or more mobile devices within the system,
wherein the policy configuration data includes asset data defining at least one physical asset within the system and user role data corresponding to a role of a group of users of the one or more mobile devices; and a processor operatively coupled to the electronic database and configured to:
receive mobile device location data indicating a specific physical location of a particular mobile device within the system;
retrieve the policy configuration data from the electronic database;
wherein the policy configuration data includes
asset data defining at least one physical asset within the system
and user role data and second user role data, each corresponding to a role of a group of users of the one or more mobile devices;
compare the received mobile device location data to the policy configuration data to determine whether the specific physical location of the particular mobile device is within a predefined spatial proximity of a specific physical asset of the at least one physical asset, the specific physical asset comprising a machine of the plurality of manufacturing machines;
receive user profile data at the central server indicating a particular user operating the particular mobile device;
compare the received user profile data to the policy configuration data to determine whether the particular user operating the particular mobile device satisfies a preexisting criteria corresponding to the user role data;
and upon determination that the particular mobile device is within the predefined spatial proximity of the specific physical asset and that the particular user operating the particular mobile device satisfies the preexisting criteria corresponding to the user role data,
initiate instructions for delivery of particular content associated with the specific physical asset to the particular mobile device;
wherein the content comprises different content specific to different physical assets, and further comprising an application for creating a session between the particular mobile device and the machine to allow the particular user to control the machine using the particular mobile device via the session;
and wherein based upon
the specific physical location of the particular mobile device
and its proximity to the specific physical asset,
and the user profile data,
content is selectively delivered to the particular mobile device indicative of operation of the specific physical asset based upon the specific physical location and the user role data when the user is one of the group of users;
receive second mobile device location data at the central server indicating a second specific physical location of a second particular mobile device within the system;
compare the second received mobile device location data to the policy configuration data to determine whether the second specific physical location of the particular mobile device is within a predefined spatial proximity of the specific physical asset;
receive second user profile data at the central server indicating a second particular user operating the second particular mobile device;
compare the second received user profile data to the policy configuration data to determine whether the second particular user operating the second particular mobile device satisfies a second preexisting criteria corresponding to the second user role data;
and upon determination that
the second particular mobile device is within the predefined spatial proximity of the specific physical asset
and that the second particular user operating the particular mobile device satisfies the second preexisting criteria corresponding to the second user role data,
initiate instructions by the central server for transferring control of the specific physical asset from the first particular mobile device to the second particular mobile device to allow the second particular user to take control of the machine using a second session between the second particular mobile device and the machine;
wherein the transferring control comprises
sending, by the central server, a command to the first particular device to remove access to the session and to the application whereby, in response, the first particular device does not subsequently control the machine.

14. A method for delivery of content to mobile devices within a system for controlling a plurality of manufacturing machines, comprising the steps of:
receiving policy configuration data at a central server, the policy configuration data defining one or more policies for delivery of content to one or more mobile devices within the system,
wherein the policy configuration data includes
asset data defining at least one physical asset within the system and user role data and second user role data, each, corresponding to a role of a group of users of the one or more mobile devices;

receiving mobile device location data at the central server indicating a specific physical location of a particular mobile device within the system;

comparing the received mobile device location data to the policy configuration data to determine whether the specific physical location of the particular mobile device is within a predefined spatial proximity of the a specific physical asset of the at least one physical asset, the specific physical asset comprising a machine of the plurality of manufacturing machines;

receiving user profile data at the central server indicating a particular user operating the particular mobile device;

comparing the received user profile data to the policy configuration data to determine whether the particular user operating the particular mobile device satisfies a preexisting criteria corresponding to the user role data;

and upon determination that the particular mobile device is within the predefined spatial proximity of the physical asset and that the particular user operating the particular mobile device satisfies the preexisting criteria corresponding to the user role data, initiating instructions via the central server for delivery of a screen of content associated with the specific physical asset to the particular mobile device;

wherein the content comprises different content specific to different physical assets, and further comprising an application for creating a session between the particular mobile device and the machine to allow the particular user to control the machine using the particular mobile device via the session;

and wherein based upon the specific physical location of the particular mobile device and its proximity to the specific physical asset, and the user profile data, content is selectively delivered to the particular mobile device indicative of operation of the specific physical asset based upon the specific physical location and the user role data when the user is one of the group of users;

receiving second mobile device location data at the central server indicating a second specific physical location of a second particular mobile device within the system;

comparing the second received mobile device location data to the policy configuration data to determine whether the second specific physical location of the particular mobile device is within a predefined spatial proximity of the specific physical asset;

receiving second user profile data at the central server indicating a second particular user operating the second particular mobile device;

comparing the second received user profile data to the policy configuration data to determine whether the second particular user operating the second particular mobile device satisfies a second preexisting criteria corresponding to the second user role data;

and upon determination that the second particular mobile device is within the predefined spatial proximity of the specific physical asset and that the second particular user operating the particular mobile device satisfies the second preexisting criteria corresponding to the second user role data, initiating instructions by the central server for transferring control of the specific physical asset from the first particular mobile device to the second particular mobile device to allow the second particular user to take control of the machine using a second session between the second particular mobile device and the machine;

wherein the transferring control comprises sending, by the central server, a command to the first particular device to remove access to the session and to the application whereby, in response, the first particular device does not subsequently control the machine.

15. The method of claim 14, wherein the screen comprises a copy of a session of an application.

16. The method of claim 15, wherein the session of the application is on another device.

17. The method of claim 14, wherein the screen comprises a shadow instance of the content.

18. The method of claim 14, wherein the session comprises a clone of the particular content.

19. The method of claim 14, wherein the policy configuration data is predefined by a system operator via a management dashboard operatively connected to the central server.

20. The method of claim 14, wherein the policy configuration data includes device configuration data defining one or more mobile device types capable of operating content.

21. The method of claim 14, further comprising the steps of:

receiving mobile device data at the central server defining a particular mobile device type of the particular mobile device being used by the particular user;

comparing the received mobile device data to the policy configuration data to determine whether the particular mobile device type satisfies the one or more mobile device types capable of operating content; and upon determination that the particular mobile device type satisfies the one or more mobile device types capable of operating content, retrieving the particular content for delivery to the particular mobile device as a function of the particular mobile device type.

* * * * *